United States Patent [19]

Studer et al.

[11] Patent Number: 4,571,529
[45] Date of Patent: Feb. 18, 1986

[54] ACTUAL SPEED VALUE CONVERTER FOR THE SPEED CONTROL IN A MOTOR DRIVE SYSTEM

[75] Inventors: Willi Studer, Nassenwil; Arturo E. Stosberg, Otelfingen, both of Switzerland

[73] Assignee: Willi Studer, AG, Switzerland

[21] Appl. No.: 553,777

[22] Filed: Nov. 21, 1983

[30] Foreign Application Priority Data

Dec. 2, 1982 [CH] Switzerland .................. 7022/82

[51] Int. Cl.⁴ .................. H02P 1/00; G11B 21/02
[52] U.S. Cl. .................. 318/327; 318/254; 318/138; 340/870.32; 340/870.37; 324/160; 310/72
[58] Field of Search .................. 318/310, 311, 312, 313, 318/314, 138, 315, 254, 366, 341, 317, 323, 324, 327, 345 A; 324/160, 166; 340/870.37, 870.32; 310/171, 72, 68, 191

[56] References Cited

U.S. PATENT DOCUMENTS

| | | |
|---|---|---|
| 2,418,471 | 4/1947 | Holden et al. .................. 310/191 X |
| 2,610,993 | 9/1952 | Stark .................. 310/191 X |
| 2,848,675 | 8/1958 | Williams et al. .................. 310/191 X |
| 2,925,590 | 2/1960 | Boltinghouse et al. .................. 340/870.37 |
| 3,198,973 | 8/1965 | Short et al. .................. 310/68 R X |
| 3,760,392 | 9/1973 | Stich .................. 318/254 |
| 3,832,635 | 8/1974 | Cass .................. 324/166 |
| 3,934,269 | 1/1976 | Fujita et al. .................. 318/327 X |
| 3,937,476 | 2/1976 | Sakai .................. 318/311 X |
| 3,963,987 | 6/1976 | Rivere .................. 324/166 |
| 4,110,672 | 8/1978 | Deplante et al. .................. 340/870.32 X |
| 4,238,782 | 12/1980 | Ogasawara .................. 340/870.37 |
| 4,329,644 | 5/1982 | Libertini et al. .................. 324/160 |
| 4,404,560 | 9/1983 | Williams, Jr. .................. 340/870.37 |
| 4,437,061 | 3/1984 | Shinozaki et al. .................. 324/166 |
| 4,461,994 | 7/1984 | MacDonald .................. 324/160 X |
| 4,482,859 | 11/1984 | Fournier .................. 324/166 X |

*Primary Examiner*—William M. Shoop, Jr.
*Assistant Examiner*—Shik Luen Paul Ip
*Attorney, Agent, or Firm*—Roylance, Abrams, Berdo & Goodman

[57] ABSTRACT

An actual speed value converter for a motor comprises a tachometer having a part rotating with the speed to be measured, e.g., a capacitive or inductive rotor, or an optical actuator disk, the tachometer determining the frequency of a frequency generator. The frequency generator is part of an action path for preparing the actual speed value, the action path comprising a frequency generator and a downstream-connected frequency discriminator.

17 Claims, 8 Drawing Figures

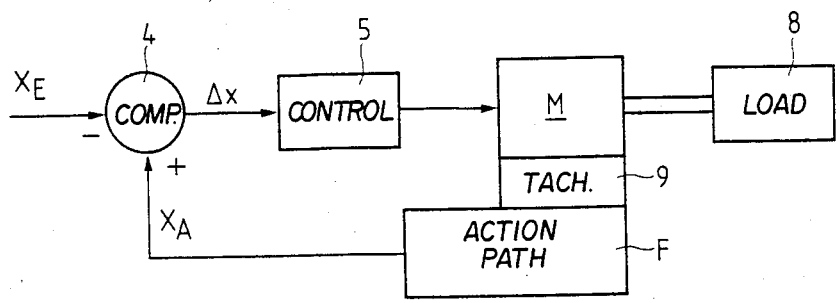
FIG. 1
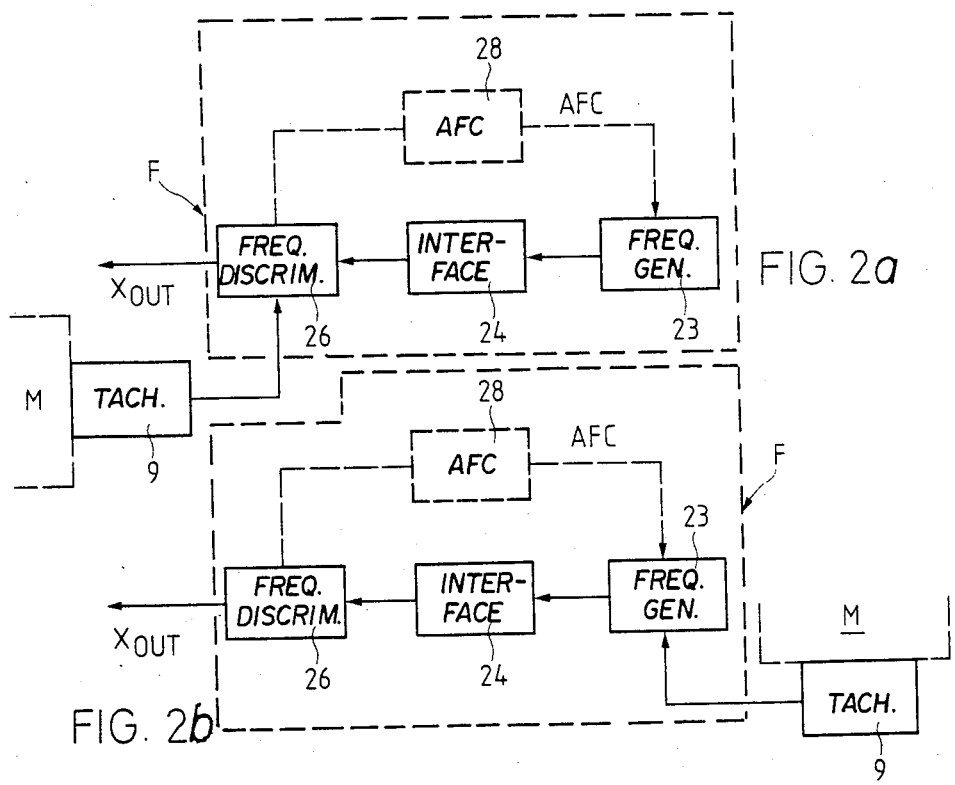
FIG. 2a
FIG. 2b

ACTUAL SPEED VALUE CONVERTER FOR THE SPEED CONTROL IN A MOTOR DRIVE SYSTEM

FIELD OF THE INVENTION

The invention relates to a speed control apparatus for controlling the rotational speed of a motor and includes a tachometer as well as a frequency generator and a frequency discriminator coupled to the tachometer.

BACKGROUND OF THE INVENTION

The invention is in the field of control and relates to a converter for speed control, particularly for drive systems with electric motors.

In speed control for motor drives, such as are conventionally used e.g. in the storage of signals of suitable carrier or storage materials and the reproduction of these signals, e.g. video signals, acoustic signals, etc., drives are now required having an extremely high constancy of the angular speed. This applies more particularly to all analog recording methods in which the pitch of the reproduced signal is dependent on the instantaneous speed of the record support. Thus, according to the frequency modulation process, the attainable useful-/interfering signal ratio is directly dependent on the mechanical constancy of the tape speed in the case of analog data stores.

It is still conventional practice to obtain the requisite running constancy of the drives by suitable flywheel masses which, together with the limited torque capacity of the drive motor, have the effect of a mechanical low-pass filter. In this way, brief disturbances to the drive, as well as load cycle effects, are reduced to assist in bringing about a uniform angular speed. Nevertheless, speed stabilization with the aid of flywheel masses suffers from important disadvantages. Apart from the necessary weight, and the resulting large bearing loads, the stored kinetic energy of the flywheel mass opposes any desired speed change by a very slow modification behaviour.

Thus, it is necessary to avoid this disadvantage wherever the speed is to be constantly, but rapidly, variable.

One known application in this direction is "electronic editing", in which the control of individual drives in complex compound systems takes place by computer. Frequently, equipment for recording and reproducing acoustic and/or video signals are used in such complex compound systems, i.e., equipment which is in part required to have an extremely high running constancy. However, using a computer is very expensive.

SUMMARY OF THE INVENTION

The problem to be solved by the present invention is therefore to provide an apparatus for known drive systems with electronic speed control and stabilization, which makes it possible, when it is necessary for the drive to run very constantly, to minimize the hysteresis in the case of speed changes, in order e.g. to achieve short starting and synchronization times.

A further object of the invention is to provide an apparatus which is simple and inexpensive and which can be incorporated into existing motor drive systems.

A further problem to be solved by the invention is to improve the immunity from interference of the speed regulation and stabilization, particularly with respect to system-inherent interference sources.

An ideal servo-system will faithfully follow the faults and errors of the jointly participating tacho-system. All errors found in determining the actual speed value act directly on the drive. Higher demands must be made on the precision of a tachometer system than on the actual drive. A tachometer system with the apparatus according to the invention satisfies such demands.

The foregoing objects are basically attained by providing an actual speed value converter for speed control in a motor drive system, the combination comprising a tachometer coupled to the motor drive system for generating a signal representative of the speed of the motor drive system; and an action path for transmitting the tachometer signal to means for adjusting the speed of the motor drive system, said action path comprising a frequency generator and a downstream-connected frequency discriminator.

The foregoing objects are also attained by providing a capacitive tachometer for operating an actual speed value converter comprising a stator and a rotor, each including a plurality of tooth-like projections arranged over the periphery thereof for varying the dielectrically acting air gap between said stator and said rotor, wherein said stator is arranged concentrically to said rotor and includes means for centering said rotor and stator in two directions at right angles to the rotation plane of said rotor.

BRIEF DESCRIPTION OF THE DRAWINGS

The invention is described in greater detail hereinafter relative to non-limitative embodiments and the attached drawings, wherein:

FIG. 1 shows in simplified diagrammatic form a controllable motor drive system including the apparatus according to the invention;

FIGS. 2a and b show two embodiments of the apparatus according to the invention;

DETAILED DESCRIPTION OF THE INVENTION

Figure 3A:
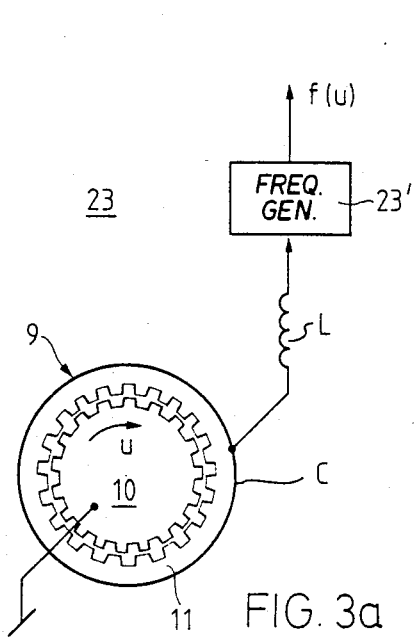
FIGS. 3a and b show two different tachometers usable in conjunction with FIG. 2b in greater detail, FIG. 3a showing a capacitive tachometer and FIG. 3b showing an inductive tachometer.

The following embodiments of the apparatus according to the invention relate to a digital system. The signal supplied by the apparatus is an a.c. voltage signal, whose frequency is in an integral relationship to the revolution frequency of the motor. Thus, the apparatus according to the invention is a tachometer circuit, as part of a servo-system.

FIG. 1 shows in the simplest possible form, a servo-system, as could be used in conjunction with the apparatus according to the invention. A comparator 4 receives signals $X_E$ for the reference input of the system and signals $X_A$ for the varied output quantity. In this case, the latter is a quantity reproducing the motor speed as accurately as possible. As usual, the signals $\Delta x$ represent the divergence from the reference input which is to be controlled and with the aid of which the running of the motor is correspondingly varied by means of a conventional control device 5. For reasons of completeness, the load 8 driven by the motor is shown and part of the motor is attached to this load 8.

A tachometer 9 takes the information on the speed from motor M and an action path F, to which further reference will be made hereinafter, prepares the tachometer signals and converts them into actual speed values $X_A$. The unconventional representation of three directly interconnected functional blocks labelled M, 9 and F stress the close connection between the motor-tachometer-action path.

In the embodiments disclosed, use is made of tachometers or speed sensing devices, which can be part of the motor, i.e., the motor rotor is also e.g. the tacho-rotor. Thus, although there can be a functional difference between the tachometer and the motor, this does not have to be kept constructionally or physically separate. A further close functional connection exists between tachometer 9 and action path F, which together form the apparatus according to the invention.

FIGS. 2a and 2b show the apparatus according to the invention in greater detail. The aforementioned action path F in the simplest construction comprises a frequency generator 23 and a downstream-connected frequency discriminator 26. As a function of the construction of these two components, it may be necessary to interpose amplifiers, signal shapers, etc. This additional expenditure is represented by a general network with a box 24. A further embodiment of action path F has a feedback to the automatic frequency control AFC, whose network 28 comprises a low-pass filter.

In FIGS. 2a and b, action takes place in action path F in different ways. In one case, tachometer 9 is connected to frequency discriminator 26 (FIGS. 2a) and in the other case, tachometer 9 is connected to the frequency generator 23 (FIG. 2b).

The embodiment according to FIG. 2b, in which tachometer 9 is connected to frequency generator 23, is shown in two variants according to FIGS. 3a and b. Both these views show that tachometer 9 is part of the frequency generator 23. Part of the tachometer can also be a physical part of motor M, which is the case here, so that these components are only functionally distinguishable. These circumstances are taken into account by the unconventional representation of FIG. 1.

Figure 3B:
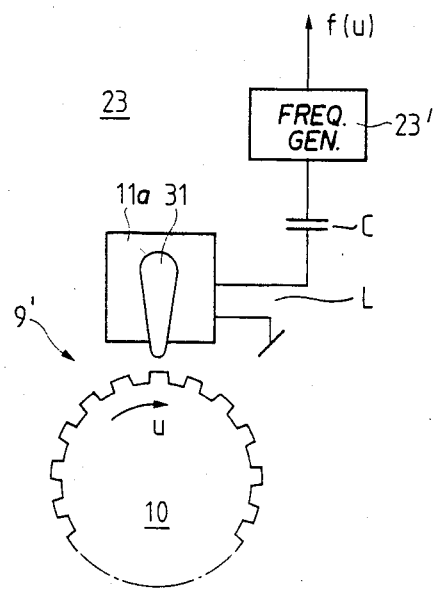

FIG. 3a shows a capacitive tachometer 9 with a rotor 10 and a stator 11, the rotor being electrically applied to earth, i.e., ground, from which the capacitive tachometer C with the series-connected inductor L forms a series resonant circuit LC for the complete generator circuit 23, whose residual wiring without a resonant circuit is designated 23'. A rotation frequency U-dependent signal f(U) appears at the frequency generator output. This also applies as shown in FIG. 3b with respect to the inductive tachometer 9' with the rotor 10 made from ferromagnetic material and a sensing inductor 31 in stator 11a. It is naturally also possible to use other resonant circuits, in which an inductor L or capacitor C is formed by the tachometer or some other adequate means.

The air gap formed between the rotor and the stator, which can be varied by specific geometrical measures during a relative movement, in the case of the capacitive tachometer serves e.g. as a dielectric and with the inductive tachometer as the essential magnetic flux resistor. The position of the speed-dependent frequency is consequently a function of the rotor or stator toothing. With a constant speed, as far as possible monochromatic frequency signals should be obtained and the superimposing of other frequency-determining geometrical features, i.e. artefacts are not desired. An additional modulation of the air gap is mainly achieved by a divergence of the concentricity of the rotor and stator, which would contribute to an interfering effect. Means for centering the tachometer used must therefore be provided for filling this requirement, as shown in FIGS. 4, 5a and 5b.

Figure 4:
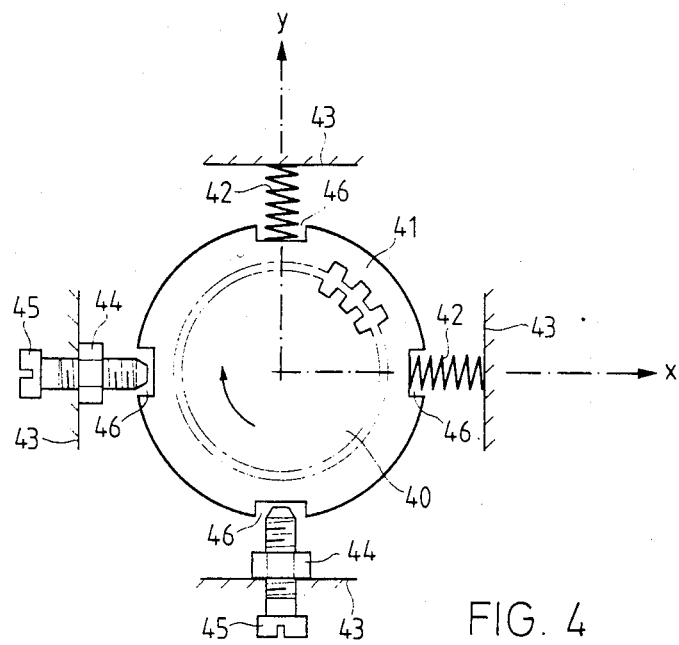
FIG. 4 shows in greater detail the capacitive tachometer as used in FIG. 3a, with a mechanical stator centering means.

FIG. 4 shows an embodiment of a mechanical centering means. Stator 41 is displaceably arranged at right angles to the rotation axis in the x, y-plane. For example, a mechanical control means, in this case a pair of screws 45 and nuts 44 on coordinate-fixed bases 43 are provided. Helical compression/tension springs 42 arranged on the force action lines of screws 45 are used for the restoring forces, the springs acting between stator 41 and the coordinate-fixed bases 43. Slots 46 indicate the adequae support of the stator.

This measure is, for example, carried out orthogonally thereto in the x-direction, which gives a centering possibility active on the complete periphery. In the case of larger control forces, together with a possibly lighweight construction of the stator, deformations of the latter from its circular shape must be expected. Deformations of this type are responsible for further frequency artefacts. This is prevented by not incorporating the stator diameter into the magnetic flux, in that e.g. the restoring spring 42 is arranged on the same side of the stator and naturally in the same common action line as control screw 45.

Figure 5A:
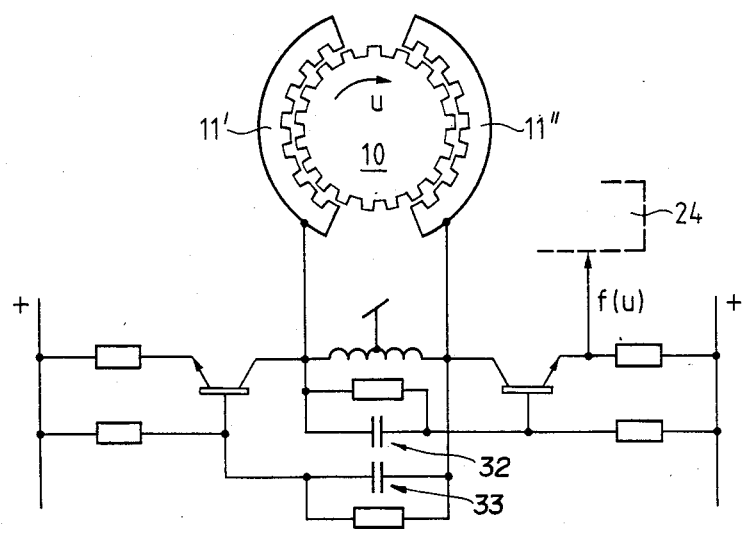
FIGS. 5a and b show in detail a capacitive tachometer, as used in FIG. 3a, with two different types of electrical stator centering means.
Figure 5B:
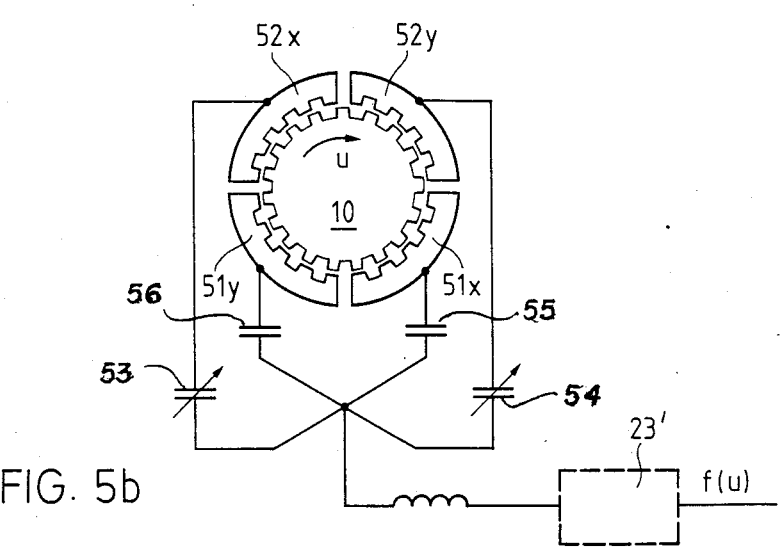

In the case of fixed geometrical arrangement, the centering of the stator can also be brought about electrically, as is shown relative to a capacitive tachometer in FIGS. 5a and b. The stator is thereby subdivided into a plurality of capacitively acting parts, i.e. electrically into a plurality of symmetrically arranged capacitors formed by rotor 10 and ring segment-like counter-electrodes. Geometrical asymmetries are then shown in different capacitance values, which can be perfectly balanced by connecting and trimming variable capacitors. Obviously, a similar measure can be taken in the case of a similarly designed inductive tachometer, e.g. by two facing sensors 11a, 31 or several pairs thereof.

The construction shown in FIG. 5a is of a simple nature, two stator segments, 11' and 11" being incorporated into a push-pull circuit. Balancing is possible by means of the two series-connected capacitors 32 and 33.

A further symmetrization is possible with the circuit shown in FIGS. 5b, which permits an electrical symmetrization in all directions of the plane at right angles to the rotation axis. It is the electrical counterpart to the mechanical solution of FIG. 4. For example, capacitor pair 51x, 52x balances a divergence between the stator center and the rotor center in the x-direction and 51y and 52y balances in the y-direction. One of the two associated capacitances must be variable in view of the y-values and vice versa in view of the x-values, with capacitors 55 and 56 being fixed and 53 and 54 being variable. In the case of a very good balancing of the bridge circuit, i.e. with separated nodes and stationary rotor, the series and parallel capacitances in the operating state give a total capacitance which, as the resonant circuit part of the frequency generator, produces a frequency precisely following the speed. It is important to have a sufficiently fine resolution by the selected number of teeth on the rotor periphery and per stator segment.

The tachometer part can also be formed by an optical actuator disk rotating at the speed of the drive, which also supplies a frequency following the speed. The light-sensitive sensor with its wiring corresponds to the frequency generator circuit part 23' and the actuator disk with light source to tachometer 9. The complete arrangement would be like the frequency generator 23 in action path F.

Since at present there are no optically controllable capacitors and instead only semiconductors and resistors, the frequency generator 23 must be constructed in the form of an astable multivibrator, whose frequency is determined by an RC-element. Resistor R is constructed as an optically controllable conductance element.

The described action path with an associated tachometer need not necessarily be used in a control system as shown in FIG. 1. Although the description may only refer to the action path and tachometer in conjunction with a control circuit, i.e. its use in a feedback loop, it is also pointed out that said arrangement can also be used for control systems, in the sense of an open automatic control system. The action path with tachometer permits a true representation of the function acting on the tachometer. In the present case, this is a speed and the electrical quantity appearing at the output of the action path is supplied as the actual value to a further control use.

While several advantageous embodiments have been chosen to illustrate the invention, it will be understood by those skilled in the art that various changes and modifications can be made therein without departing from the scope of the invention as defined in the appended claims.

What is claimed is:

1. Speed control apparatus for a motor, the combination comprising:
    a motor,
    a tachometer coupled to said motor to generate a signal representative of the speed of said motor;
    an action path for receiving said motor speed signal from said tachometer;
    said action path comprising frequency generator means and frequency discriminator means connected downstream of said frequency generator means;
    said frequency generator means producing a signal having a frequency higher than the frequency of said tachometer signal;
    means to deliver said frequency generator signal to said frequency discriminator means;
    said frequency discriminator means being adapted for demodulation of a signal having a given carrier frequency;
    a resonant circuit interposed between said tachometer and said action path;
    said resonant circuit comprising an inductive means and a capacitive means;
    said resonant circuit capacitive means comprising a physical part of said tachometer;
    comparator means;
    means to connect the output of said frequency discriminator means to said comparator means;
    means to supply a speed reference signal to said comparator means; and
    means to use the output of said comparator means to control the speed of said motor.

2. The combination of claim 1, wherein said tachometer comprises a capacitive tachometer which is connected as the capacitive element of said resonant circuit.

3. The combination of claim 2, wherein said tachometer comprises a capacitive tachometer which is connected as the determinative element for the frequency position in said frequency discriminator means.

4. The combination of claim 2, wherein said capacitive tachometer has a rotor which is connected with an earth connection of said action path.

5. The combination of claim 1, wherein said tachometer comprises an inductive tachometer which is connected as the inductive element of said resonant circuit.

6. The combination of claim 1, wherein said tachometer is a capacitive tachometer.

7. The combination of claim 1, wherein said tachometer is an inductive tachometer.

8. The combination of claim 1, wherein said resonant circuit is connected to said frequency generator means in said action path.

9. The combination of claim 1, wherein said resonant circuit is connected to said frequency discriminator means in said action path.

10. The combination of claim 1, and control means interposed between said comparator means and said motor.

11. The combination of claim 1, and an interface interposed between said frequency generator means and said frequency discriminator means in said action path.

12. The combination of claim 1, and an automatic frequency control feedback network connected between said frequency generator means and said frequency discriminator means.

13. The combination of claim 1, wherein said tachometer comprises a rotor and a stator, the interior surface of said stator and the exterior surface of said rotor being formed with teeth, means to ground said rotor, and said inductance means of said resonant circuit comprising a coil also connected to said action path.

14. The combination of claim 13, said rotor and said stator defining an air gap therebetween, means to mechanically and adjustably mount said stator with respect to said air gap and with respect to a fixed location, said adjustable mounting means comprising two adjusting means each arranged on a line, said lines intersecting substantially at the axis of rotation of said rotor and being located in a plane normal to said axis, and each of said adjusting means comprising a spring and an adjusting screw both arranged to bear on said stator on opposite ends of their respective line.

15. The combination of claim 13, said rotor and said stator defining an air gap therebetween, said stator being divided into a plurality of segments, means to electrically correct for variations in said air gap comprising adjustable capacitor means and means to electrically connect said adjustable capacitor means to said frequency generator means.

16. The combination of claim 13, wherein said automatic frequency control comprises a low-pass filter.

17. The combination of claim 1, wherein said tachometer comprises a rotor and a stator, the exterior surface of said rotor being formed with teeth, a sensing coil associated with said stator, means to ground one end of said sensing coil, and means to connect the other end of said coil via a capacitor to said frequency generator means.

* * * * *